United States Patent [19]

Schuhmacher

[11] 3,723,479

[45] Mar. 27, 1973

[54] 2,2'-DIACYLAMINO-1,1'-DIANTHRAQUINONYLS

[75] Inventor: Alfred Schuhmacher, Ludwigshafen, Germany

[73] Assignee: Badische Anilin- & Soda-Fabrik Aktiengesellschaft, Ludwigshafen am Rhine, Germany

[22] Filed: Aug. 26, 1970

[21] Appl. No.: 67,226

[30] Foreign Application Priority Data

Sept. 1, 1969 Germany.....................P 19 44 276.3
Nov. 3, 1969 Germany.....................P 19 55 157.6

[52] U.S. Cl..................................260/368, 260/273

[51] Int. Cl. ..........................C09b 1/40, C09b 1/42

[58] Field of Search..............................260/368, 273

[56] References Cited

UNITED STATES PATENTS

| | | | |
|---|---|---|---|
| 1,714,249 | 5/1929 | Smith et al. | 260/273 |
| 3,194,820 | 7/1965 | Grelat | 260/367 |
| 2,068,313 | 1/1937 | Dettwyler | 260/368 |

*Primary Examiner*—Henry R. Jiles
*Assistant Examiner*—E. Jane Skelly
*Attorney*—Johnston, Root, O'Keeffe, Keil, Thompson & Shurtleff

[57] ABSTRACT

2,2'-diacylamino-1,1'-dianthraquinonyls having the general formula:

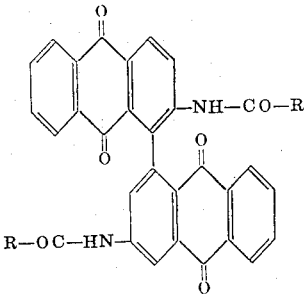

(I)

in which R denotes alkyl having one to six carbon atoms or substituted or unsubstituted aryl and to a method for the production of the compounds (I). The compounds (I) may be prepared by reaction of 1-halo-2-acylaminoanthraquinones having the formula:

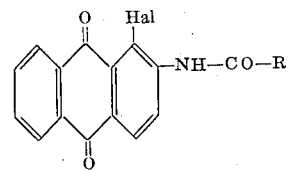

(II)

in which R has the above meanings and Hal denotes a chlorine or bromine atom with copper powder in a solvent which contains the grouping

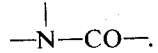

The compounds (I) represent a valuable intermediate for the manufacture of dyes, e.g. flavanthrene.

5 Claims, No Drawings

2,2'-DIACYLAMINO-1,1'-DIANTHRAQUINONYLS

This invention relates to new 2,2'-diacylamino-1,1'-dianthraquinonyls having the formula:

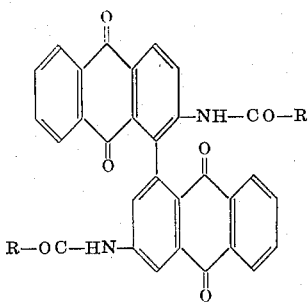

(I)

in which R denotes alkyl having one to six carbon atoms or unsubstituted or substituted aryl, and a process for the production of these compounds.

The new 2,2'-diacylamino-1,1'-dianthraquinonyls may for example contain as alkyl radicals: methyl, ethyl, propyl, butyl or hexyl and as aryl radicals for example phenyl. The aryl radical may also contain substituents such as halogen atoms or low molecular weight alkyl or alkoxy groups. Examples of substituted aryl radicals are: 2-chlorophenyl, 3-chlorophenyl, 4-chlorophenyl, 4-methoxyphenyl or methylphenyl.

Those compounds having the formula (I) which contain an alkyl radical having one to three carbon atoms or the phenyl radical as the radical R are of special commercial interest.

The new 2,2'-diacylamino-1,1'-dianthraquinonyls are valuable intermediates, for example for the production of dyes. Thus for example flavanthrene can be prepared particularly advantageously from the new 2,2'-diacylamino-1,1'-dianthraquinonyls.

The new 2,2'-diacylamino-1,1'-dianthraquinonyls are obtained in good yields when a 1-halo-2-acylaminoanthraquinone having the formula:

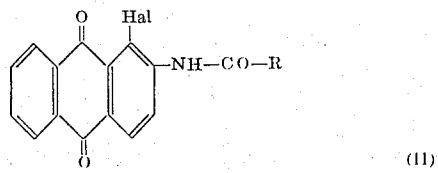

(II)

in which Hal denotes a chlorine or bromine atom, is reacted in a solvent which contains the grouping -N-CO- with copper powder.

Examples of solvents which contain the grouping -N-CO- are amides or imides such as acid amides of secondary amines of which dimethylformamide or dimethylacetamide are mentioned or heterocyclic compounds such as methylpyrrolidone.

In the new process it is advantageous to use 0.5 to 3 times the weight of the said solvents with reference to 1-halo-2-acylaminoanthraquinone. Other inert solvents such as nitrobenzene or a halobenzene may be added to the solvents specified. Since the reaction mixture becomes mobile in the course of the reaction, the addition of large amounts of solvent does not add any advantage.

The most advantageous amount of copper depends on the size of the radical R. As a rule from 20 to 35 percent by weight based on 1-halo-2-acylaminoanthraquinone is enough.

The temperature at which the reaction begins depends on the type of solvent. In all cases however it is considerably lower than in similar prior art methods. Thus for example the reaction can be successfully concluded in dimethylformamide at only 70° C. The temperature used is generally from 50° C to the boiling point of the solvent, preferably from 60° C to 130° C.

Particularly pure compounds having the formula (I) are obtained in a smooth reaction and with high yields when the reaction of the 1-halo-2-acylaminoanthraquinones having the formula (II) with copper powder in the solvents of the said type is carried out at temperatures below 50° C. to room temperature. As the rate of reaction naturally falls as the temperature falls, it is recommended that the reaction should be carried out in the presence of a small amount of halogen. In this way the reaction is completely concluded in a short time at only room temperature. Small amounts of halogen may be for example 0.25 to 2 parts by weight of chlorine, bromine or iodine based on 100 parts by weight of the compound having the formula (II).

This method of producing 2,2'-diacrylamino-1,1'-dianthraquinonyls is particularly preferred because of its technical advantages and at the same time its very pure reaction product.

The procedure in the production of the new 2,2'-diacylamino-1,1'-dianthraquinonyls may be for example that the copper powder and solvent are placed in a vessel and the 1-halo-2-acylamino compound is added at moderately elevated temperature. It is most advantageous however to place the 1-halo-2-acylamino compound with the solvent in a vessel and to control the exothermic reaction by adding copper powder in portions. Both components may however also be added to the solvent and the reaction initiated by cautious heating. The temperature then rises spontaneously, in some cases up to the boiling point of the solvent, and if necessary may be checked by cooling.

The working up of the reaction products is very simple. The desired dianthraquinonyl either separates during the reaction or upon cooling and is isolated by filtration. After conventional decoppering with hydrochloric acid and chlorate according to the Ullmann reaction, the desired compounds are obtained in a pure form as yellow to yellowish brown substances having a melting point above 300° C.

The smooth formation of the new 2,2'-diacylamino-1,1'-dianthraquinonyls by the said method is surprising because for example it does not occur when the starting materials are exposed to the conditions under which 2,2'-diacylamino-1,1'-dianthraquinonyls of dibasic carboxylic acids such as phthalic acid are prepared from the corresponding 1-halo-2-acylaminoanthraquinones. In this prior art method (Fiat Final Report, 1313, volume II, 175, and BIOS Report, 987, 34) the solvents used are nitrobenzene, naphthalene or trichlorobenzene. Under these known conditions, the halogen atom in the 1-position is eliminated from the starting material having the formula (II) without the desired dimerization taking place. Compounds having the formula (II) readily eliminate their halogen atoms as those skilled in the art known (see J.Chem.Soc., 2161 (1951)).

The following Examples illustrate the invention. The parts specified in the Examples are parts by weight.

EXAMPLE 1

100 parts of 1-chloro-2-acetaminoanthraquinone (obtained by acylation of 1-chloro-2-aminoanthraquinone with acetic anhydride or acetyl chloride in nitrobenzene) is heated to 70° C in 150 parts of dimethylformamide. 29 parts of copper powder is added and the whole is stirred for 8 hours at 70°C, and then cooled to room temperature. The 2,2'-diacetylamino-1,1'-dianthraquinonyl formed is suction filtered and washed with 100 parts of cold dimethylformamide. After conventional decoppering, 72 parts of the new compound is obtained which vats with a red color and melts at 360° C.

When nitrobenzene or trichlorobenzene is used as solvent instead of dimethylformamide, unchanged 1-chloro-2-acetaminoanthraquinone is recovered at the said temperature of 70° C.

EXAMPLE 2

30 parts of copper powder is introduced into 100 parts of dimethylacetamide. 115 parts of 1-bromo-2-acetaminoanthraquinone is added at 100° to 110° C in the course of 1 hour to 2 hours. When it has all been introduced, the whole is stirred for another 3 hours at 100° to 110° C, cooled and worked up as described in Example 1.

64 parts of 2,2'-diacetylamino-1,1'-dianthraquinonyl is obtained.

In nitrobenzene or trichlorobenzene dehalogenation takes place under the same conditions and 2-acetaminoanthraquinone having a melting point of 238° to 240° C is obtained.

EXAMPLE 3

200 parts of dimethylformamide, 35 parts of copper powder and 105 parts of 1-chloro-2-propionylaminoanthraquinone are heated to 90° C. After the reaction has commenced, heating is discontinued. The temperature rises spontaneously to the boiling point of the solvent. The reaction is complete after boiling has taken place for one hour. The whole is cooled and worked up as already described. The yield is 68 parts of 2,2'-dipropionylamino-1,1'-dianthraquinonyl having a melting point of 345° to 350° C. The compound vats with a red color.

EXAMPLE 4

300 parts of N-methylpyrrolidone and 100 parts of 1-chloro-2-acetaminoanthraquinone are heated to 80° C. 30 parts of copper powder is added in the course of 1 hour at this temperature. After having been stirred for 6 hours at from 80° to 85° C, the whole is cooled and worked up in the usual way. 58 parts of the same product as in Example 1 is obtained.

EXAMPLE 5

100 parts of 1-chloro-2-benzoylaminoanthraquinone is introduced into 150 parts of dimethylformamide at 80° C. 23 parts of copper powder is added and the whole is stirred at from 75° to 80° C for 8 hours, and allowed to cool overnight. The product is suction filtered and washed with 150 parts of dimethylformamide. It is decoppered as usual and 54 parts of 2,2'-dibenzoylamino-1,1'-dianthraquinonyl having a melting point of 322° to 326° C is obtained. The compound vats with a red color.

EXAMPLE 6

4.8 parts of 1-chloro-2-acetaminoanthraquinone is stirred into 7.2 parts of anhydrous dimethylformamide at room temperature. 1.15 parts of copper powder and 1 percent (with reference to 1-chloro-2-acetaminoanthraquinone) of bromine are added. The reaction begins immediately. The whole is stirred for 8 hours at 22° to 35° C, suction filtered, washed with dimethylformamide and decoppering is carried out with chlorate and hydrochloric acid. 3.74 parts of 2,2'-diacetylamino-1,1'-dianthraquinonyl having a melting point of 367° to 369° C is obtained, i.e., 88 percent of the theory.

EXAMPLE 7

4.8 parts of 1-chloro-2-acetaminoanthraquinone is stirred into 7.2 parts of dimethylformamide with 1.2 parts of copper powder and 0.048 part of iodine at 35° to 40° C for 3 hours. The product is worked up as in Example 6 and 3.62 parts of 2,2'-diacetylamino-1,1'-dianthraquinonyl (86 percent of the theory) is obtained.

When the procedure of Example 6 or Example 7 is repeated but without adding a halogen and while stirring for 7 hours at 35° to 40° C, similar results are obtained.

I claim:

1. A 2,2'-diacylamino-1,1'-dianthraquinonyl having the formula

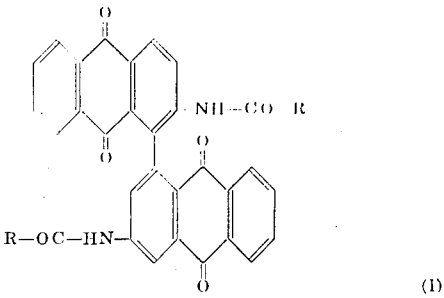

(I)

in which R denotes alkyl having one to six carbon atoms, phenyl or phenyl substituted by chloro, lower alkyl or lower alkoxy.

2. A 2,2'-diacylamino-1,1'-dianthraquinonyl having the formula (I) in claim 1 in which R is a radical selected from the group consisting of methyl, ethyl, propyl, butyl, hexyl, phenyl, 2-chlorophenyl, 3-chlorophenyl, 4-chlorophenyl, 4-methoxyphenyl and 4-methylphenyl.

3. 2,2'-diacetylamino-1,1'-dianthraquinonyl.

4. 2,2'-dipropionylamino-1,1'-dianthraquinonyl.

5. 2,2'-dibenzoylamino-1,1'-dianthraquinonyl.

* * * * *